United States Patent [19]

Moore et al.

[11] Patent Number: 4,713,566

[45] Date of Patent: Dec. 15, 1987

[54] APPARATUS FOR ENCLOSING AND COOLING TURBINE GENERATOR COLLECTOR SETS

[75] Inventors: William G. Moore, Winter Springs; Louis E. Nagoda, Winter Park, both of Fla.

[73] Assignee: Westinghouse Electric Corp., Pittsburgh, Pa.

[21] Appl. No.: 940,671

[22] Filed: Dec. 11, 1986

[51] Int. Cl.[4] .......................... H02K 9/28; H02K 13/00
[52] U.S. Cl. ........................................ 310/58; 310/89; 310/239
[58] Field of Search ................... 310/58, 62, 89, 227, 310/228, 232, 239, 242, 63

[56] References Cited

U.S. PATENT DOCUMENTS

| | | | |
|---|---|---|---|
| 1,719,407 | 7/1929 | Trudeau | 310/227 |
| 3,784,855 | 1/1974 | Motegi et al. | 310/227 |
| 4,621,211 | 11/1986 | Spirk | 310/239 |

FOREIGN PATENT DOCUMENTS

| | | | |
|---|---|---|---|
| 710091 | 1/1980 | U.S.S.R. | 310/227 |

Primary Examiner—Patrick R. Salce
Assistant Examiner—D. L. Rebsch
Attorney, Agent, or Firm—Daniel C. Abeles

[57] ABSTRACT

An enclosure for a collector set on a turbine generator includes a non-conducting transverse baffle which divides the enclosure into a separate compartment for each polarity. An aperture in the baffle forms with the generator shaft an annular passage through which cooling air passes from one compartment to the other and in so doing flows directly over the collector ring and brush sets in each compartment to provide more efficient cooling. A removable housing is guided into place over the collector set by a grooved guide which engages the top edge of the baffle and forms a seal between compartments. Single doors on each side of the housing provide access to both polarities and carry a seal, which mates with the baffle with the doors closed, to force the air to pass through the annular passage. An insulated safety handle above each door provides support when leaning inward to change brushes with the generator at full load, and discourages inserting both hands into the enclosure at once.

12 Claims, 7 Drawing Figures

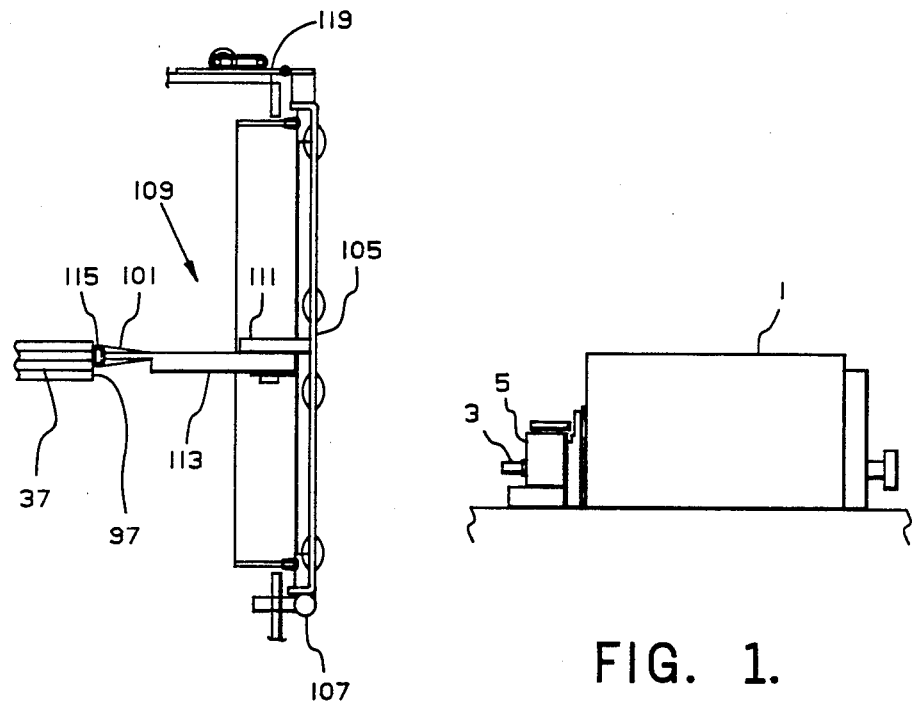
FIG. 6.
FIG. 1.
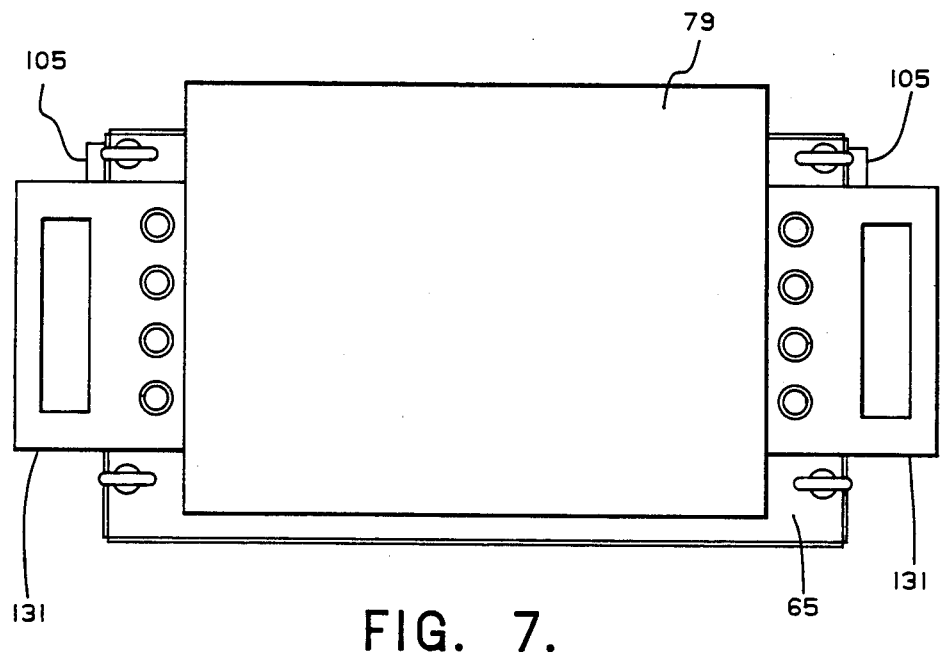
FIG. 7.

APPARATUS FOR ENCLOSING AND COOLING TURBINE GENERATOR COLLECTOR SETS

BACKGROUND OF THE INVENTION

1. Field of the Invention

This invention relates to apparatus for enclosing exciter collector sets on turbine driven electric power generators, and more particularly to such apparatus with improved ventilation for the collector rings and brushes, and with features which permit the collector brushes to be changed with the generator at full load.

2. Background Information

Large turbine generators with static excitation utilize collector sets for conducting current to the rotor. The collector sets comprise a pair of collector rings, one for each polarity, mounted on the rotor and a set of stationary brushes angularly displaced around, and in contact with, each collector ring. In order to protect the collector sets and to prevent inadvertent contact with them by personnel, the collector sets are enclosed within an enclosure which includes a fixed base. In order to provide ventilation within the enclosure to cool the collector sets, a centrifugal fan is typically mounted on the rotor shaft within the enclosure to draw air into the enclosure through openings in the base and to exhaust the cooling air through an exhaust stack in the roof of the enclosure.

Typically, the collector set enclosure includes stationary transverse end walls with sealed openings through which the rotor shaft passes, and a removable U-shaped housing defining the roof and side walls of the enclosure. While the housing can be removed for maintenance either by sliding it horizontally or lifting it vertically, in some installations it is desirable to be able to change the brushes without shutting the generator down. Accordingly the housing may be provided with doors through which access may be gained to the collector set. In some generators/having large numbers of brushes, several brushes are mounted in insulated cartridges which can be removed and replaced through the access door while the unit is in operation. Since hundreds of amperes of current can be flowing through the collector sets, it is important that contact not be made with both polarity units or with the collector set and a grounded conductor at the same time.

The increase in the operating temperature of the collector set resulting from the fact that it is enclosed reduces its efficiency. It is desirable therefore to provide improved ventilation for the collector set to improve its rating. It is also desirable to improve the ventilation so that the size of the enclosure can be reduced. At the same time, it is in some instances desirable to have such an enclosure with improved ventilation and reduced size which permits safe changing of brushes while the generator is in operation.

SUMMARY OF THE INVENTION

The present invention realizes these results through the provision of a generally planar baffle which extends transverse to the generator shaft between the collector rings and which defines an aperture which forms with the shaft an annular passage. An enclosure forms with the baffle a first chamber which encloses the first collector ring and set of brushes, and a second chamber which encloses the second set of brushes and second collector ring. The collector rings and brushes are located on opposite sides of the baffle adjacent the aperture so that air which is drawn into the first chamber passes over the first collector ring and set of brushes, and passes through the annular passage into the second chamber where it passes over the second collector ring and second set of brushes before being exhausted from the second chamber. This arrangement greatly increases the efficiency of the ventilating system, which permits the rating of a given size collector set to be increased and/or permits the size of the enclosure to be reduced.

A removable U-shaped housing forms the roof and side walls of the enclosure and is vertically lowered over stationary transverse walls and the baffle to form the chambers enclosing the collector sets. A channel mounted in the housing slides down over the upper edge of the baffle to not only form a seal between the first and second chamber so that air can only pass between chambers through the annular passage and therefore over the collector rings and brush sets, but to also axially locate the housing as it is lowered into place. Preferably this channel is made of spring material such as steel to improve its sealing ability and is provided with flared ends which help to guide the housing into the correct position.

Preferably, the third stationary transverse wall forms with the housing and the second transverse wall a third, exhaust chamber. A centrifugal fan mounted on the generator shaft at an annular passage between the second and third chambers draws the air into the first chamber through the annular passage into the second chamber and discharges it into the exhaust chamber which preferably communicates with an exhaust stack in the roof of the housing.

In order to provide access for changing brushes during operation of the generator, doors are mounted in access openings on each side of the housing which extend axially to both sides of the baffle, so that either set of brushes may be serviced through a single door. A safety handle made of electrically non-conductive material is mounted adjacent to the door to provide a convenient hand grip for service personnel, and preferably extends horizontally substantially the full width above the door. This handle serves two purposes, first it assures that only one hand is free so that both polarity sets of brushes cannot be grasped at the same time, and secondly, it provides support while leaning toward the brushes.

BRIEF DESCRIPTION OF THE DRAWINGS

A full understanding of the invention can be gained from the following description of the preferred embodiments when read in conjunction with the accompanying drawings in which:

FIG. 1 is a side elevation view of an electric power generator incorporating apparatus in accordance with the invention;

FIG. 6 is an enlarged horizontal section through one of the doors on the apparatus; and FIG. 7 is a top plan view of the apparatus.

DESCRIPTION OF THE PREFERRED EMBODIMENTS

Figure 2:
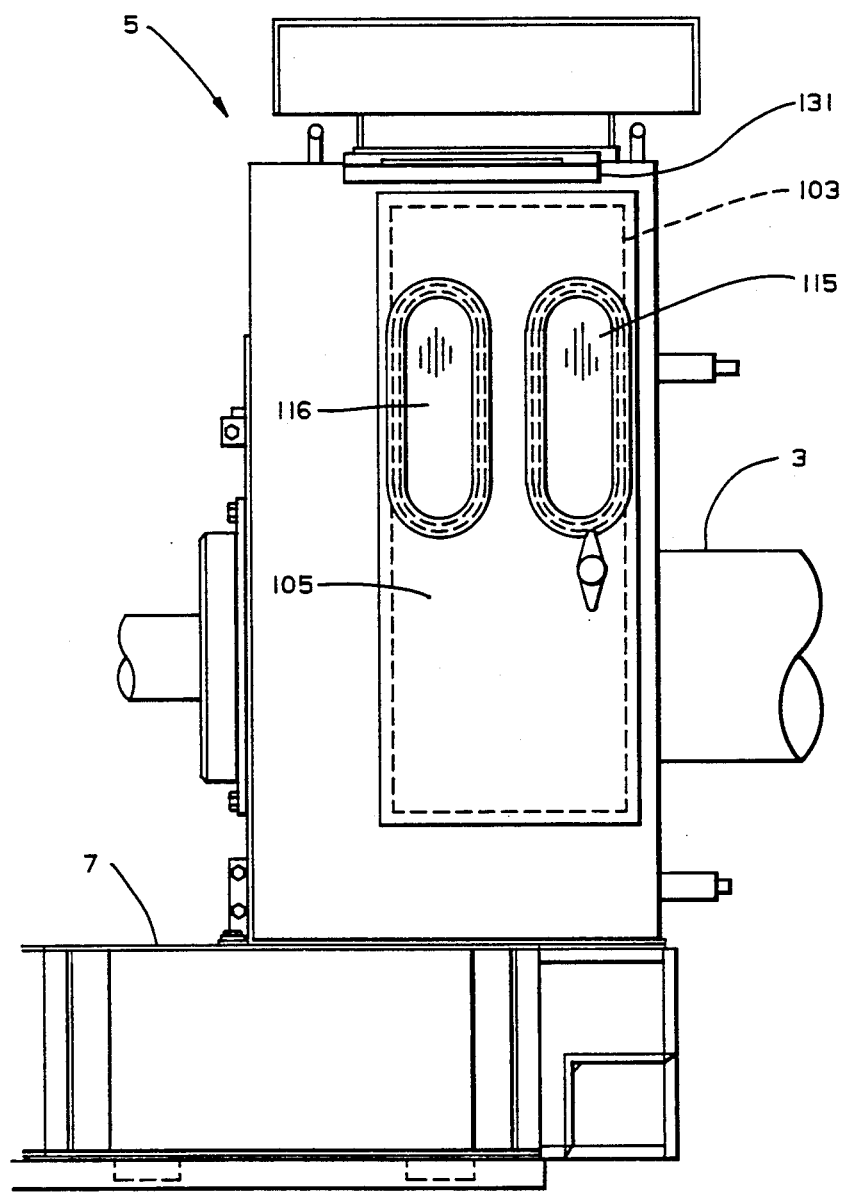
FIG. 2 is an enlarged side elevation view of the apparatus shown in FIG. 1.
Figure 3:
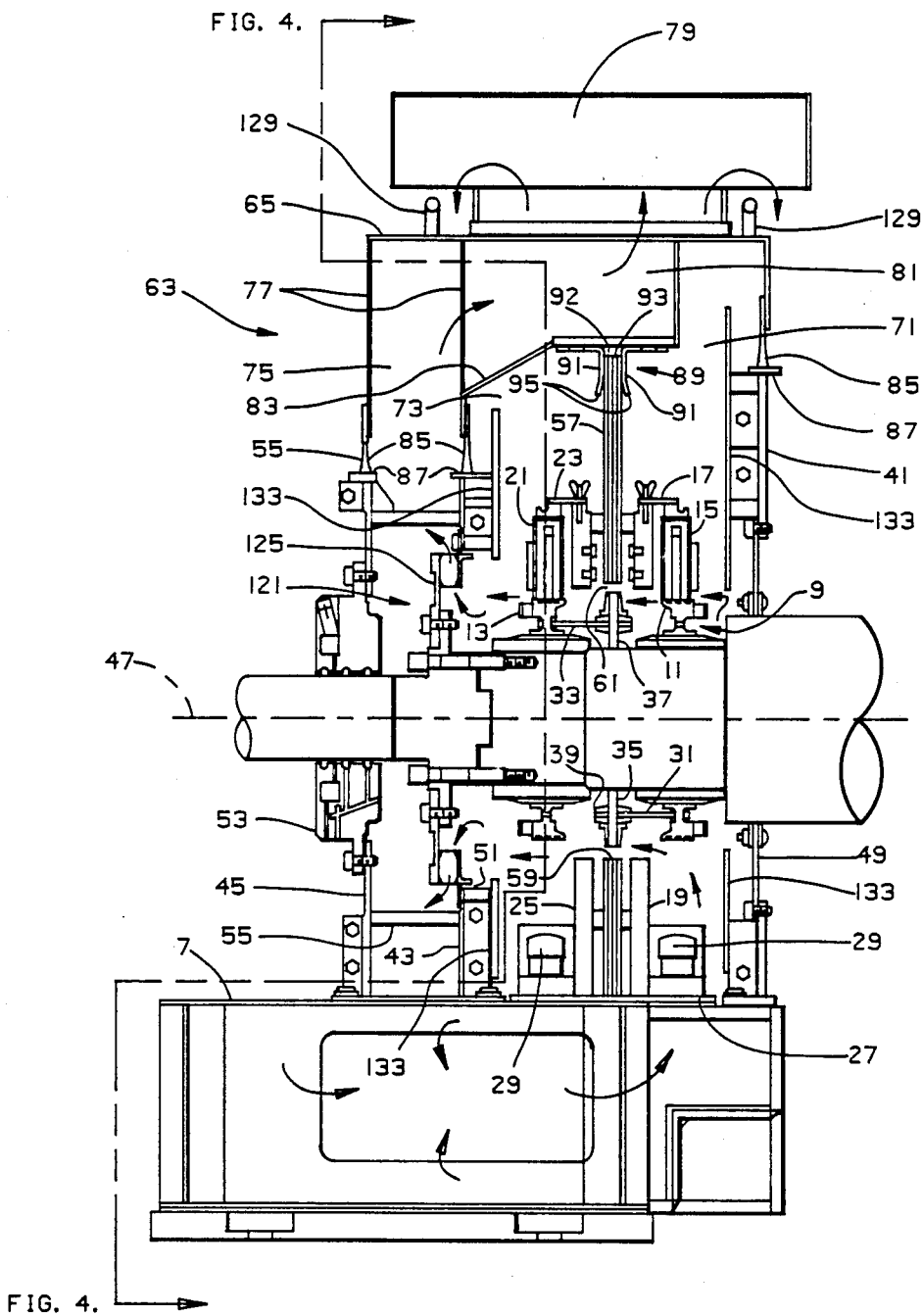
FIG. 3 is a vertical longitudinal section through the apparatus of FIG. 2 as viewed from the same side.
Figure 4:
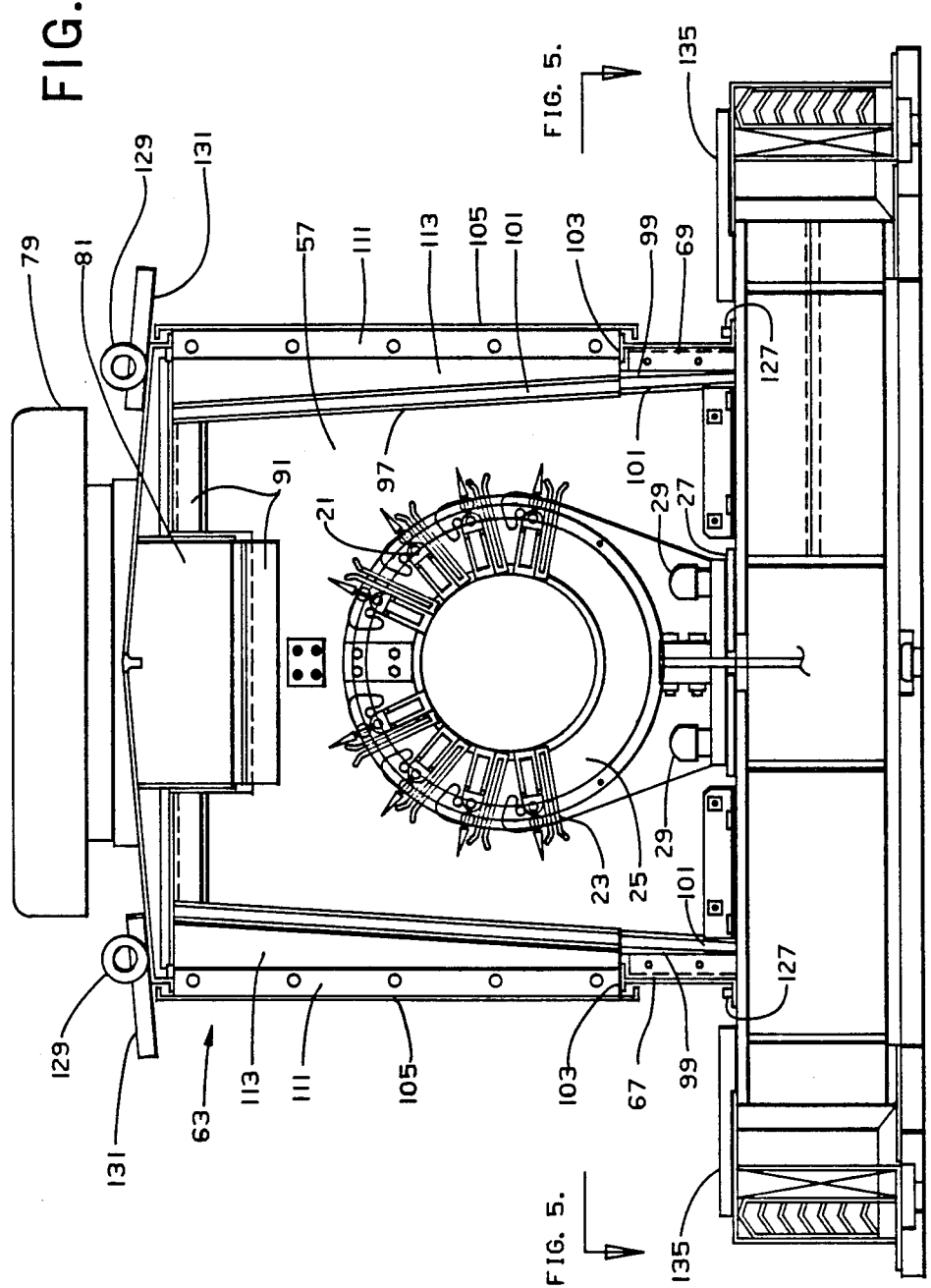
FIG. 4 is a transverse vertical view of the apparatus partially in section taken along the line 4—4 in FIG. 3 with the shaft removed for clarity.

Referring to FIGS. 1 and 2, a turbine driven electric power generator has a rotor shaft 3 which passes through an enclosure 5. A fixed base member 7 provides the floor of enclosure 5. As shown in FIG. 3 in which the enclosure 5 has been sectioned through a vertical plane parallel to the axis of the rotor shaft 3, the enclosure houses a collector set 9 which includes a pair of axially spaced collector rings 11 and 13 mounted on and rotatable with the shaft 3. As can be seen from FIGS. 3 and 4, the collector set 9 includes a first set of brushes 15 mounted angularly about, and in sliding contact with, first collector ring 11 by brush holders 17 supported by an annular plate 19 known as a sickle which is bolted to the base member 7. A second set of brushes 21 is similarly mounted angularly about the second collector ring 13 by brush holders 23 supported by a second sickle 25, also bolted to the base member 7. The sickles which are electrically isolated from the base member 7 by an insulating pad 27 have terminals 29 which extend through the base member to engage electrical leads (not shown).

Bolts 31 and 33 extending through the collector rings 11 and 13 parallel to the rotor shaft 3, connect the respective collector rings to the ends of exciter conductors 35 and 37, which extend radially outward from the shaft, through connectors 39. The brushes and collector rings provide sliding connections of opposite polarity for excitation of the turbine generator rotor coil (not shown) carried by the rotating shaft 3.

The enclosure 5 includes three stationary walls 41, 43 and 45 bolted to the base member 7 transverse to the longitudinal axis 47 of the shaft 3. The first transverse wall 41 is axially spaced on one side of the collector set 9, and has a brass seal 49 which forms a rotating seal with the rotor shaft 3. The second transverse wall 43 is axially spaced on the other side of the collector set 9 and defines an aperture 51 through which the shaft 3 extends. The third transverse wall 45 is axially spaced from the second wall 43 and on the same side of the collector set 9. A plastic seal 53 in this third wall 43 also forms a rotating seal with the rotor shaft 3. A number of cylindrical spacers 55 stiffen the second vertical wall 43.

A vertical, planar baffle 57 is secured to the base member 7 transverse to the axis 47 of the shaft 3 between the sickles 19 and 25. This baffle 57 is made of a non-conductor such as a glass expoxy material. A suitable glass expoxy is Nema grade G-11 material which is well known for its electrical insulating properties. The baffle 57 defines an aperture 59 through which the shaft 3 passes to form an annular passage 61. This baffle not only provides an electrical insulating barrier between the two polarties of the collector at 9, but also plays an important role, as will be seen, in cooling the collector set.

The enclosure 5 also includes a U-shaped vertically removable housing 63 which includes a roof 65 and side walls 67 and 69. The housing 63 is lowered vertically over the collector set 9 such that it forms, with the base member 7, first transverse wall 41 and baffle 57, a first chamber 71 which encloses the first collector ring 11 and first set of brushes 15. The housing 63 similarly forms with the base member 7, baffle 57 and second transverse wall 43 a second chamber 73 which encloses the second collector ring 13 and second set of brushes 21. An exhaust chamber 75 is formed by the second and third transverse walls 43 and 45, the base member 7 and the housing 63. The exhaust chamber 75 extends upward into the housing 63 between downwardly extending walls 77 and communicates with an exhaust stack 79 on top of the housing through an intermediate chamber 81 formed in the housing by partition 83.

Rubber seals 85 on the housing 63 seat on sealing surfaces 87 on the top of transverse walls 41, 43 and 45 as the housing 63 is lowered into place, to provide airtight seals for the three chambers 41, 43 and 45. A spring guide 89 on the inner surface of the roof 65 of the housing and the underside of partition 83 guides the housing into position and forms a seal with the baffle 57. The spring guide 89 includes a pair of L-shaped members 91, made for instance of spring steel, spaced apart to form a downwardly facing groove 92 which receives the top edge 93 of the baffle 57. The free edges 95 of the L-shaped members 91 flare outwardly to guide the housing into proper alignment. This spring guide 89 also prevents air from passing between the chambers 71 and 73 over the baffle 57. The side edges 97 the transverse walls 41, 43 and 45 and of the baffle 57 all taper inward and upward so that these walls and the baffle are trapezoidal in shape. Sealing partitions 99 on the inner surfaces of the side walls 67 and 69 of the housing 63 similarly taper inwardly and upwardly and support rubber seals 101 which seal against the edges 97. The angle formed by this arrangement provides relief for positioning the housing relative to the fixed walls and baffle, yet provides a good seal when the housing is fully lowered.

In order to permit access to the brushes 11 and 13 when the machine is in operation, an access opening 103 is provided in each of the side walls 67 and 69 of the housing 63. These access openings 103 extend axially in both directions from the baffle 57 so that both sets of brushes are accessible through a single opening. The access openings 103 are provided with doors 105 mounted by a hinge 107 along one side edge. A tapered seal support 109 mounted on the inside of each door 105 carries a seal 101 which seals against the tapered edge 97 of the baffle 57. The seal support includes a fixed member 111 secured to the door 105 and adjustable member 113 bolted thereto to permit adjustment of the seal against the baffle 57. These seals as shown in FIG. 6 are of the type having a hollow center 115 which increases the flexibility of the seal and improves its effectiveness. The other rubber seals 101 and 85 may be of a similar-type. With the doors 105 closed, the seals 101 carried by seal supports 109 seat against the side edges 97 of the baffle 57 to prevent the flow of air around the sides of the baffle. Windows 117 in the doors 105 permit observation of the brushes without opening the doors. Latches 119 lock the doors in the closed position.

Figure 5:
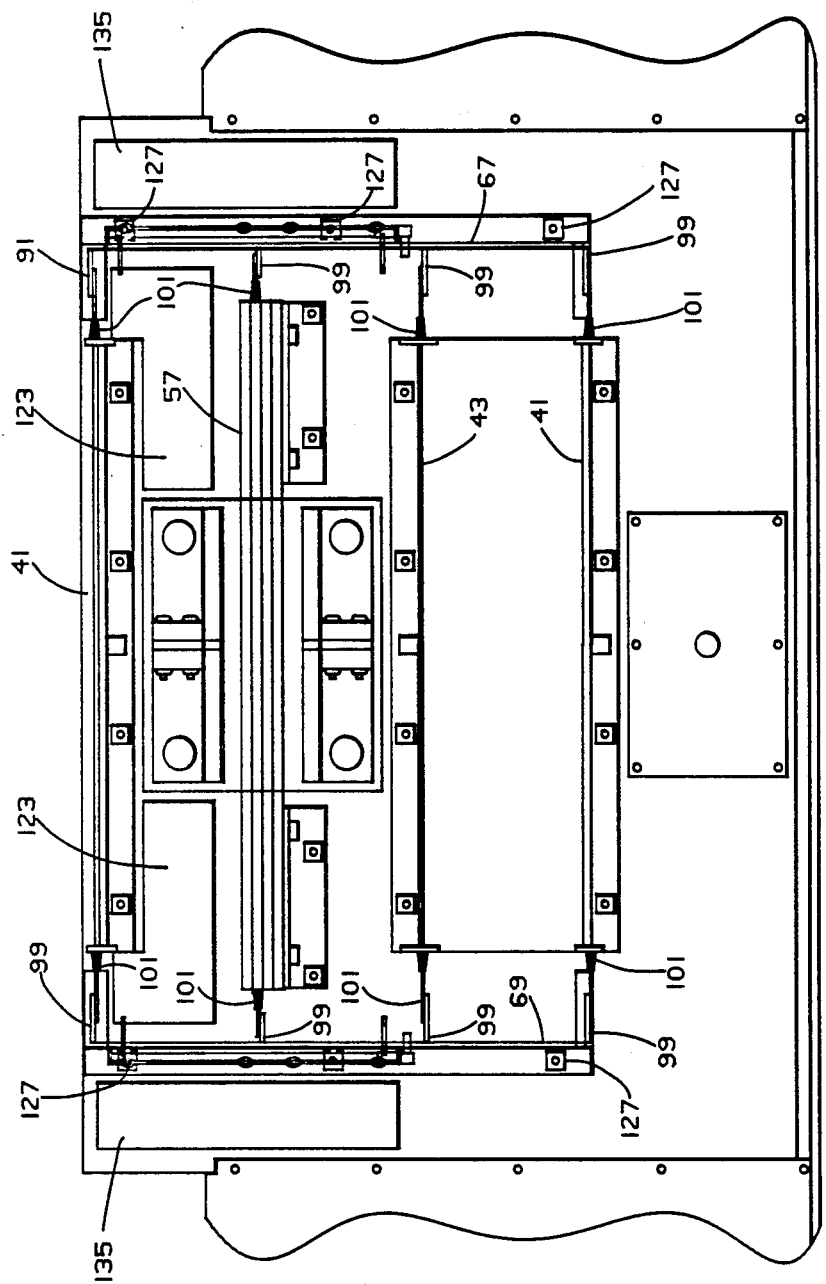
FIG. 5 is a horizontal section through the apparatus taken along the line 5—5 in FIG. 4.

The enclosure 5 is ventilated by a ventilating system 121 which includes vents 123 (FIG. 5) extending through the base member 7 into chamber 71 and a centrifugal fan 125 mounted on the shaft 3 at the opening 51 in the transverse wall 43. As the fan 125 rotates with the shaft 3, air is drawn into the base member 7 and through the vents 123 into the chamber 71 as shown by the arrows in FIG. 3. Because guide 89 along the top and the seals 101 along the sides of baffle 57 prevent the flow of air around the edges of the baffle, the air can only pass from the chamber 71 to the chamber 72 through the annular passage 61. In so doing it passes directly over the first collector ring 11 and first set of brushes 15. The air is drawn by the fan 125 through the chamber 73 directly over the second collector ring 13 and second set of brushes 21 and is discharged into the exhaust chamber 75. The discharged air passes upward in chamber 75 through the intermediate chamber 81 and out to the atmosphere through the exhaust stack 79. This arrangement forces the cooling air into direct contact with the components to be cooled, namely the collector rings and brushes, and as a result is more efficient than previous designs. With this design, a significantly higher collector ring voltage can be used for the same size rings as was used in the past, and at the same time the housing overall dimensions are significantly reduced.

The housing 63 provided by the invention can be quickly removed by removing 6 bolts 127 securing it to the base member 7 and then lifting it vertically upward manually or perhaps with the aid of a small jib crane which can be connected to eye bolts 129 at the four corners of the housing.

An additional advantage of the apparatus provided by the invention is that the brushes can be safely changed at full rotational speed (3600 rpm) at full load. The two compartments 71 and 73 separated by the insulating baffle 57 not only lead to more efficient cooling of the collector set 9, but also make changing brushes safer by isolating the two polarities. The single doors 105 on each side of the housing provide easy access to both sets of brushes, but in order to preclude someone from reaching in to touch both polarities at once a safety handle 131 is provided above each access opening 103. These handles preferably extend axially substantially the full width of the openings 103 and are made of an electrical insulating material such as the Nema grade G-11 glass expoxy material of which the baffle 57 is made. The location of the handles 131 above the access openings not only discourages touching both polarities at the same time, but provides support when leaning inward toward the rotating shaft. The natural tendency of one to grasp an available handle then, not only protects the user from electrical shock, but also mechanical injury. It also reduces the possibility of reaching into one compartment with both hands and touching the brushes and the housing. To further protect against this possibility, insulating panels 133 are secured to the transverse walls 41 and 43.

In changing brushes while the machine is in operation, one wears rubber gloves and stands on a rubber mat 135 on the base member 7. By grasping the safety handle 131 with one hand, only one hand is available to touch the brushes. The baffle 57 prevents short circuits between the two polarities and the insulating panels 129 prevent shorting one polarity to ground.

As can be appreciated from this description, the invention as a whole provides efficient cooling of the collector set and safe conditions for changing the brushes while at load. It also provides a housing which is easily removed for full access to the collector set, and is easily replaced and sealed when maintenance has been completed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for an electric power generator having a rotatable shaft, first and second collector rings axially spaced on said shaft and rotatable therewith, and first and second sets of stationary collector brushes supported angularly about, and in contact with, the first and second collector rings respectively; said apparatus comprising:
   a generally planar baffle extending substantially transverse to said shaft between said collector rings and defining an aperture through which said shaft extends;
   enclosure means forming with the baffle a first chamber enclosing said first collector ring and first set of collector brushes, and a second chamber enclosing the second collector ring and the second set of brushes, said aperture defined by said baffle forming with the shaft an annular passage between said first and second chambers;
   seal means for substantially sealing off airflow between the baffle and the enclosure means; and
   ventilating means for introducing air into the first chamber and withdrawing the air from the second chamber, said collector rings and collector brushes being located in the respective chambers adjacent to said aperture in the baffle such that the air introduced into the first chamber flows over said collector brushes and collector rings in both chambers in passing from the first chamber to the second chamber through said annular passage.

2. The apparatus of claim 1 wherein said enclosure means comprises:
   a stationary base forming the floor of said enclosure means;
   first and second stationary walls mounted generally transverse to said shaft which extends therethrough, said transverse walls forming end walls of the first and second chambers respectively;
   means for fixedly mounting said baffle to said base;
   a generally U-shaped vertically removable housing forming side walls and a roof for said first and second chambers; and
   seal means for sealing off airflow between the baffle and the housing.

3. The apparatus of claim 2 wherein said seal means for sealing off airflow between said baffle and the housing includes a guide member mounted to the housing and defining a downwardly facing groove which receives an upper edge of said baffle as said housing is lowered vertically toward the stationary base.

4. The apparatus of claim 3 wherein said guide member defines a groove which flares in the axial direction to aid in aligning the groove, and therefore the housing, axially with regard to the baffle, as the housing is lowered into place over the baffle.

5. The apparatus of claim 2 wherein said second transverse wall defines an annular outlet for said second chamber surrounding said shaft and wherein said ventilating means includes openings defined by said enclosure means through which air enters the first chamber, and a fan mounted on and rotatable with said shaft at said annular outlet for drawing air through said vent means into said first chamber, over said first collector ring and set of brushes, through said annular passage into the second chamber, over said second collector ring and set of brushes and through said annular outlet.

6. The apparatus of claim 5 wherein said enclosure means includes a third stationary transverse wall defining with said second transverse wall and said housing a third chamber into which air withdrawn from the second chamber is discharged through said annular outlet, said combination further including an exhaust stack in the roof of said housing through which air from the third chamber is exhausted.

7. The apparatus of claim 2 wherein at least one side of said housing defines an access opening extending axially in both directions relative to said baffle to provide access to both sets of collector brushes;
a door mounted in said access opening for providing selective access to said both sets of collector brushes; and
door seal means mounted on said door to engage said baffle to block airflow from said first chamber to said second chamber between said door and baffle when said door is closed.

8. The apparatus of claim 7 including a electrically non-conductive safety handle mounted on said housing adjacent to said access opening to be grasped with one hand by a person changing brushes with the other hand.

9. The apparatus of claim 7 wherein said electrically non-conductive safety handle is mounted on said housing above said access opening and extends axially in both directions from said baffle.

10. In combination with an electric power generator having a shaft rotatable about a generally horizontal axis;
first and second axially spaced collector rings mounted on and rotatable with said rotatable shaft;
first and second sets of collector brushes;
mounting means for mounting said brushes angularly about and in sliding contact with said first and second collector rings respectively;
a stationary base member positioned under said collector rings;
a substantially vertical baffle mounted on said base member generally transverse to the axis of said shaft and defining a first aperture through which said shaft extends to form a first annular passage;
a first transverse wall mounted on said base parallel to and axially spaced from one side of said baffle, and through which said shaft extends;
a second transverse wall mounted on said base generally parallel to and axially spaced from the other side of said baffle, and defining a second aperture through which said shaft extends to define a second annular passage;
a third transverse wall mounted on said base generally parallel to and axially spaced from the second wall in a direction remote from said baffle, said shaft also passing through send third transverse wall;
a generally U-shaped removable housing having a roof and two side walls, said housing (1) forming with the base, the first transverse wall and said baffle a first chamber enclosing said first collector ring and first set of collector brushes, (2) forming with the base, baffle and second transverse wall a second chamber enclosing said second collector ring and second set of collector brushes, and (3) forming with the base and second and third transverse walls a third chamber, said base defining openings into said first chamber through which air enters said first chamber;
an exhaust stack mounted on the roof of the housing in communication with said third chamber; and
a fan mounted on said shaft at said second annular passage, to draw air into the first chamber through said openings defined by said base, over said first collector ring and first set of brushes, through said first annular passage into said second chamber and over said second collector ring and second set of brushes, through said second annular passage into the third chamber and out through said exhaust stack.

11. The combination of claim 10 wherein each side wall of said housing defines an access opening extending axially in both directions from the baffle to provide access to both the first and second chambers and therefore both sets of brushes, doors mounted in said access openings and safety handles mounted on said housing above the access opening and extending generally horizontally, substantially the full width of said access opening.

12. The combination of claim 11 wherein said housing is vertically removable and includes a guide mounted to said housing defining a downwardly extending groove with outwardly flaring bottom edges which guides said housing into position over, and forms a seal with, said baffle.

* * * * *